United States Patent [19]

Zapryanov et al.

[11] Patent Number: 4,814,993
[45] Date of Patent: Mar. 21, 1989

[54] METHOD AND APPARATUS FOR THE CONTROL OF FUEL CONSUMPTION IN AN AIRPLANE

[75] Inventors: Yordan D. Zapryanov; Dimcho I. Boyadjiev; Desho I. Mladenov; Lyudmil K. Mihailov; Kiril H. Kolchakov; Kostadin B. Botev; Anton D. Tzekov; Kostadin J. Dinev; Michail P. Andronov; Kolyo E. Kolev, all of Sofia, Bulgaria

[73] Assignee: Centralina Laboratoria Po Sistemi Za Upravlenie, Sofia, Bulgaria

[21] Appl. No.: 936,533

[22] Filed: Nov. 26, 1986

Related U.S. Application Data

[63] Continuation-in-part of Ser. No. 897,883, Aug. 19, 1986, abandoned.

[30] Foreign Application Priority Data

Aug. 19, 1985 [BG] Bulgaria .................. 71491

[51] Int. Cl.⁴ .......................... G05D 1/00; G05D 7/00
[52] U.S. Cl. ................................ 364/442; 364/431.01; 244/181
[58] Field of Search ............... 364/442, 433, 434, 440, 364/439, 427, 428, 430, 431.07, 431.01; 244/178, 180, 181; 73/178 T

[56] References Cited

U.S. PATENT DOCUMENTS

| | | | |
|---|---|---|---|
| 4,063,072 | 12/1977 | Sochtig et al. | 364/431 |
| 4,159,088 | 6/1979 | Cosley | 244/182 |
| 4,312,041 | 1/1982 | DeJonge | 364/442 |
| 4,325,123 | 4/1982 | Graham et al. | 364/431.07 |

OTHER PUBLICATIONS

Farmer, "Delco Electronics Flight Management System For Air Force, C.141, Aircraft", 1980, pp. 191–198, 1980 IEEE, National Aerospace & Electronics Conference, US—CL.
Stengel, "Energy Management For Fuel Conservation in Transport Aircraft", pp. 464–470, IEEE Transactions on Aerospace and Eletronic Systems, vol. AES—12, No. 4, Jul. 1976.
Zaprianov, "Optimal Range Performance Control of Aircraft", 10th World Congress on Automatic Control, Munich, Jul. 27–31, 1987, pp. 253–256.

Primary Examiner—Parshotam S. Lall
Assistant Examiner—Thomas G. Black
Attorney, Agent, or Firm—Klein & Vibber

[57] ABSTRACT

A method for the automatic control of fuel consumption in an airplane, comprises the determination and indication in real time of the specific range of the airplane as a ratio of the ground speed and the fuel flow rate. A maximum specific range is searched and maintained by producing, in the intervals between two subsequent searches of the maximum, control actions for maintaining an angle of attack, which corresponds to the last maximum of the specific range. When the conditions under which the maximum has been found to change, a new maximum is searched. An apparatus for performing the method, comprises transducers of ground speed and fuel flow rate, and a computing microprocessor connected via an output and an interface to a digital indicator as well as to a device for controlling the thrust of the airplane engines.

6 Claims, 1 Drawing Sheet

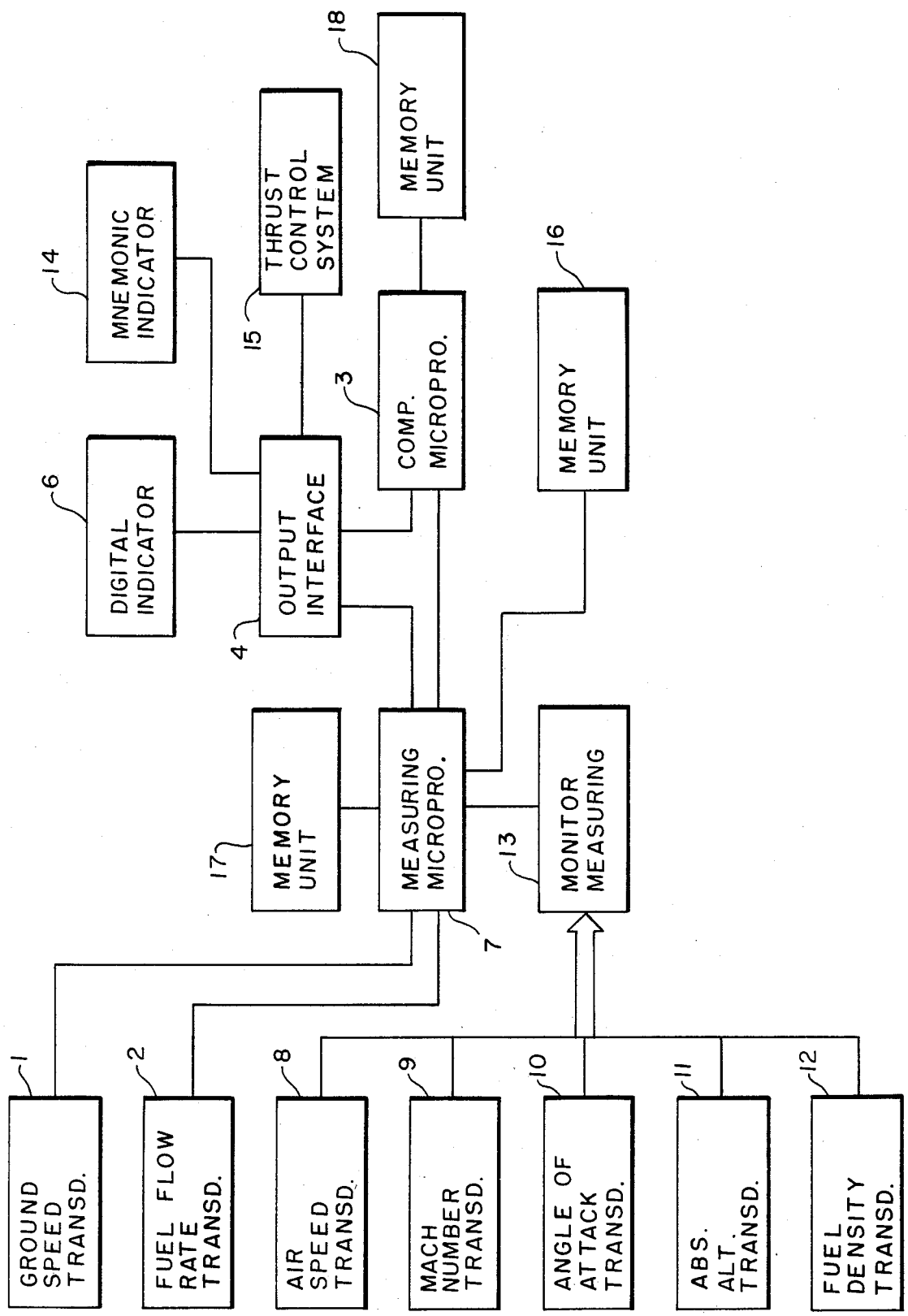

METHOD AND APPARATUS FOR THE CONTROL OF FUEL CONSUMPTION IN AN AIRPLANE

This application is a continuation-in-part application of application Ser. No. 897,883 now abandoned, filed on Aug. 19, 1986.

BACKGROUND OF THE INVENTION

This invention relates to a method and apparatus for the control of fuel consumption in an airplane.

It is well known that during the cruise flight for every altitude and for every airplane gross weight there is an optimal air speed at which the greatest fuel economy can be obtained. The efficiency of the fuel consumption can be evaluated by the criterion "specific range", calculated as a ratio of the "ground speed" and the "fuel flow rate", measured in distance perunit of fuel (e.g. km/ton). The relationship between the specific range and air speed (or Mach number) is represented by a smooth curve with a single maximum of the specific range at a certain value of the air speed. So, it is possiblbe to fly at maximum specific range, adjusting the air speed at the appropriate optimal value, via corresponding setting of the thrust of the airplane. This can be done manually by the pilot if there is a calculating unit, or by an automatic system, incorporating some methods of search and control.

The main disturbance causing a shift of the specific range maximum to the direction of lower air speeds is the continuous decrease of the airplane's weight, due to the fuel consumption. This one, and some other disturbances, as varitions of wind direction and velocity, of air temperature, change of cruise altitude, etc., make it necessary to search periodically, or better continuously, a new maximum.

A known method for the control of fuel consumption of different types of airplanes consists in the following steps: at the beginning of the cruise flight the maximum value of the specific range is to be found via manual adjustment of the engines' throttles. After fining the maximum the pilot has to maintain the air speed constant for a pre-determined tim etinerval, and then a new maximum of the specific range is to be searched. These two steps are repeated during the hwole cruise flight. (See, for example, fuel Management Computer Model CD-3000, *Airlines Pilots Operating and Reference Manual*, 1981, Aero Systems Inc.)

A drawback of the above-described known method is that the maintenance of a constant air speed in the intervals between two subsequent searches of the maximum specific range results in a shift away from the optimum conditions because of the reduction of the weight of the airplane due to the consumption of fuel. Moreover, the variations of the external conditions, such as altitude, wind and air temperature, result in an additional change of the position of th maximum of the specific range and corresponding optimal air speed. Until the elapse of the time between two searches, the shift of the maximum remains uncontrollable and the airplane flies a long time at non-optimum air speed and fuel consumption. Moreover, during the process of search of the maximum specific range the method does not provide the necessary information for the direction of search, i.e. increasing or decreasing the thrust, the magnitude of the thrust increments and for the moment when the search must stop. This results in an increase of the number of search steps and to an additional excessive consumption of fuel.

The aforedescribed method for the control of fuel consumption is effected by a system comprising transducers for detecting ground speed and fuel flow rate, connected to a computing microprocessor, which is connected via an output interface to a digital indicator and a keyboard (See, Management Computer model CD-3000, supra). The drawbacks of the known method are inherent in the known apparatus as well.

It is, therefore, a general object of this invention to provide a method and an apparatus for the control of fuel consumption which is featured by an increased degree of control efficiency.

SUMMARY OF THE INVENTION

The inventive method for the control of fuel consumption comprises the real-time calculation of the specific range of the airplane as a ratio between the ground speed and the fuel flow rate. The search of the maximum specific range is carried out using adaptive increments of the thrust which magnitudes and direction signs are in accordance with the magntidues and the signs of the derivative in successive points of the curve, expressing the relationship between the specifc range and air speed (Mach number). When the absolute value of a derivative become equal or less than a predetermined value, calculated on the basis of the measurement errors of the ground speed and fuel flow rate, the searching is stopped and the corresponding values of the angle of attack, altitude and ground speed are stored. Since then the angle of attack is maintained constant until the variation of the ground speed exceeds a predetermined value, or the altitude of the cruise flight is changed. It was provided theoretically and in practice by the inventors, that such a category of control ensures flying continuously at optimal speed with maximum specific range, irrespectively of the internal and external disturbances. See, Zapryanou et al, *Optimal Range Performance Control of Aircraft*, 10th World Copngress on Automatic Control, Munich, July 27-31, 1987, pages 253-256.

The main disturbance (the decrease of the airplane weight) is compensated by the maintenance of the constant angle of attack. The change of the cruise altitude causes immediate search of a new maximum. The influence of the majority of the other disturbances (wind, air temperature, etc.) finally results in ground speed variations. When these variations exceed a predetermined value, the new search of the maximum is initiated. These two steps of searching and maintaining the optimal flight conditions (optimal angle of attack) are repeated until the end of the cruise flight. Normally, in a typical flight of four hours, not more than 2 to 4 searchings of the maximum specific range are necessry.

The present invention also provides a system for the control of fuel consumption which automatically carries out the above described procedures of the method and which comprises transducers for ground speed and fuel flow rate, and a computing microprocessor, connected via an output interface to a digital indicator. The transducers for ground speed and fuel flow rate are connected to a measuring microprocessor. Moreover, transducers for air speed, for Mach number, for angle of attack, for absolute altitude and for fuel density are connected via a monitoring measuring unit (input interface, analog to digital converter with multiplexor, e.g.) to the measuring microprocessor, which is connected in parallel with the computing microprocessor, and to a second input of the output interface, connected by its third output to a mnemonic indicator, and by its fourth output to the system for controlling the thrust of the airplane engines (auto-throttle system). The mnemonic indicator shows the pilot the directions of the steps during the search of the maximum specific range, and when the searching has stopped. Both the mnemonic and digital indicators may be used for manual control.

An advantage of the method and apparatus for the control of fuel consumption according to the invention is that by maintaining a constant angle of attack during the intervals between two subsequent searches of the maximum specific range, a flight in optimum conditions with respect to the fuel consumption is ensured. Moreover, the optimization and automation of the process of search of the maximum reduces the number of necessary iterations. All this results in an increase in the control efficiency.

BRIEF DESCRIPTION OF THE DRAWINGS

The features of the present invention are shown by way of example diagrammatically in the attached drawing wherein: the single FIGURE illustrates a preferred embodiment of the apparatus of the invention in schematic form.

DESCRIPTION OF THE PREFERRED EMBODIMENT

Referring to the FIGURE, the apparatus for the control of fuel consumption comprises transducers for ground speed 1 and for fuel flow rate 2, and a computing microprocessor 3. An output interface 4 is provided with two inputs and three outputs. The computing microprocessor 3 is connected to the memory unit 18, memory unit 16 and to one of the inputs of the output interface 4, which is connected to a mnemomic display 14 and a digital indicator 6, by two of its outputs. The transducers for ground speed 1 and fuel flor rate 2 are connected to a measuring microprocessor 7, which measuring microprocessor is connected in parallel with the computing microprocessor 3 and to the memory unit 17, memory unit 16 and to a second input of the output interface 4. Transducers for air speed 8, for Mach number 9, for angle of attack 10, for absolute altitude 11 and for fuel density 12 are connected via a monitoring measuring unit 13 to the measuring microprocessor 7. The output interface 4 is connected by its third output to a system for controlling the thrust of the airplane engines 15.

The apparatus of the invention operates as follows:

Before starting the airplane engines, the supply of the system is switched on. At the same time, data from the transducers for fuel flow rate, ground speed, air speed, Mach number, angle of attack, aboslute altitude, and fuel density are automatically and continuously entered into the system in intervals of 10 seconds. After reaching cruise altitude, the first search of maximum specific range begins automatically. On the basis of the information entering the system via the monitoring measuring unit 13 and the measuring microprocessor 7, control actions by the computing microprcessor 3 are produced and are fed via the output interface 4 to the system for controlling the thrust of the airplane engines 15 so that the process of search of the maximum is optimized. After finding the optimum specific range, the system stores the values of the angle of attack, the altitude of flight and the ground speed. If the latter two values are within preset limits, the computing microprocessor 3 produces control actions for maintaining a constant angle of attack, which are fed via the output interface 4 to the system for controlling the thrust 15. If the altitude of flight or the ground speed violate these limits, then the computing microprocessor 3 begins to produce control actions for the search of a new maximum. All controla ctions of microprocessor 3 are also indicated on the mnemonic display 14, and this provides the ability for manual override if necessary to increase the reliability of the system. During the time of search of a maximum specific range, the initial and the current values of the specific range appear simultaneously on the digital indicator 6. During all the time of the flight, it is possible to observe on the same indicator all values measured by the transducers.

Although the invention is described and illustrated with referencce to a preferred embodiment thereof, it is to be expressly understood that it is in no way limited to the disclosure of such preferred embodiment but is capable of numerous modifications within the scope of the appended claims.

We claim:

1. A method for the automatic control of fuel consumption of an airplane during cruise flight, comprising the following steps:

measuring ground speed, fuel flow rate, fuel density, air speed, altitude and angle of attack;

determining the start of cruise flight using real flight data;

interatively incrementing fuel rate and calculating specific range unitl maximum value of specific range is found;

storing values of ground speed, altitude and angle of attack at which maximum specific range is found;

iteratively measuring ground speed, altitude and angle of attack and maintaining a constant angle of attack by incrementing fuel flow rate;

calculating a new maximum specific range only when a change is noted in ground speed or altitude.

2. A method as claimed in claim 1 wherein said claculation of maximum specific range is computed by a gradient procedure.

3. An apparatus for the control of fuel consumption in an airplane, comprising a transducer for determining ground speed, a transducer for determining fuel flow rate, a transducer for determining altitude, and a transducer for determining angle of attack;

a computing microprocessor and a measuring microprocessor, each connected parallelly with the other and each being connected to an output interface;

said transducers providing input for sai dmeasuring microprocessor; and thrust control means for varying fuel flow rate, said output interface being connected to said thrust control means;

whereby saic omputing microprocessor computes specific range interatively unitl a maximum specific range is found; and said maximum specific range is recomputed only when a change is noted in ground speed or altitude.

4. An apparatus as claimed in claim 3, further comprising additional transducers for determining air speed, Mach number, and fuel density, said additional transducers providing additional input for said measuring microprocessor; and a mnemonic indicator and a digital indicator connected to said output interface.

5. An apparatus for the control of fuel consumption in an airplane, comprising
   means for iteratively measuring ground speed, fuel flow rate, altitude, and angle of attack;
   means for computing maximum specific range based on ground speed, fuel flow rate, altitude, and angle of attack;
   said computing means being connected to said measuring means whereby said measuring means provides input for said computing means;
   means for varying fuel flow rate;
   said means for varying fuel flow rate being connected to said computing means whereby said means for varying fuel flow rate is controlled by an output of said computing means;
   whereby said angle of attack is maintained at a constant value by varying fuel flow rate in order to achieve maximum specific range and
   said maximum specific range is recomputed only when a change is noted in ground speed or altitude.

6. An apparatus as claimed in claim 5, further comprising
   said measuring means further comprising means for measuring air speed, mach number, and fuel density;
   said measuring means having a memory for storing measured values and said computing means having a memory for storing computed values;
   a common memory, said measuring means and said computing means being connected to said common memory for exchanging information;
   whereby said computing means recomputes maximum specific range whenever the difference between values of ground speed or altitude in memory and values measured by said measuring means is greater than a predetermined amount.

* * * * *